United States Patent [19]

Shimizu et al.

[11] Patent Number: 4,519,273
[45] Date of Patent: May 28, 1985

[54] AUTOMATIC TRANSMISSION FOR VEHICLES

[75] Inventors: Takeo Shimizu; Takeo Hiramatsu; Bonnosuke Takamiya; Hiroshi Fukuchi, all of Kyoto, Japan

[73] Assignee: Mitsubishi Jidosha Kogyo Kabushiki Kaisha, Tokyo, Japan

[21] Appl. No.: 432,875

[22] Filed: Oct. 5, 1982

[30] Foreign Application Priority Data

Oct. 6, 1981 [JP] Japan ................................. 56-159058

[51] Int. Cl.³ ...................... F16H 3/74; G05G 11/00; B60K 41/08
[52] U.S. Cl. .............................. 74/752 A; 74/483 PB; 74/862; 74/866; 74/867; 74/871; 180/272; 180/285
[58] Field of Search ................. 74/866, 861, 862, 870, 74/871, 752 A, 752 D, 867, 483 PB; 180/272, 285

[56] References Cited

U.S. PATENT DOCUMENTS 2,514,963 7/1950 McRae ........................ 74/483 PB
3,000,230 9/1951 Froslie ........................ 74/483 PB
3,125,893 3/1964 Bensinger ......................... 74/866
3,141,350 7/1964 Bevacqua et al. ........... 74/483 PB X
3,938,409 2/1976 Uozumi ..................... 74/752 A X
4,166,513 9/1979 Johnson .......................... 180/285
4,392,543 7/1983 Buckhouse et al. ............... 180/272

FOREIGN PATENT DOCUMENTS 0040301 11/1981 European Pat. Off. ........... 74/866
2429357 2/1980 France .......................... 74/861
2042105 9/1980 United Kingdom .............. 74/866

Primary Examiner—Allan D. Herrmann
Assistant Examiner—Stephen B. Andrews
Attorney, Agent, or Firm—Sughrue, Mion, Zinn, Macpeak, and Seas

[57] ABSTRACT

An automatic vehicle transmission is operated simply by driver selection of a forward or backward switch, utilizing an electric and hydraulic control system to effect speed changes among the various forward speeds, neutral and park. Also, during a shift, a solenoid valve is used to temporarily lower the pressure to prevent undue shift shock.

15 Claims, 7 Drawing Figures

| STAGES OF SPEED CHANGE<br>FRICTION ELEMENTS | 1st | 2nd | 3rd | 4th | R | N.P |
|---|---|---|---|---|---|---|
| FRONT CLUTCH 24 | | | ○ | | ○ | |
| REAR CLUTCH 26 | ○ | ○ | ○ | | | |
| KICKDOWN BRAKE 30 | | ○ | | ○ | | |
| LOW REVERSE BRAKE 32 | ○ | | | | ○ | |
| ONE-WAY CLUTCH 34 | ◍ | | | | | |
| FOUR-SPEED CLUTCH 28 | | | | ○ | | |

| STAGES OF SPEED CHANGE | SOLENOID VALVE 134 | SOLENOID VALVE 136 |
|---|---|---|
| 1st | ON | ON |
| 2nd | OFF | ON |
| 3rd | OFF | OFF |
| 4th | ON | OFF |

AUTOMATIC TRANSMISSION FOR VEHICLES

BACKGROUND OF THE INVENTION

This invention relates to improvements in automatic vehicle transmissions.

There are known prior art arrangements in which, to allow a gear transmission mechanism to change speeds in several stages, include a vehicular automatic transmission provided with a manually operated valve in an oil hydraulic circuit, the manually operated valve holding six positions, i.e., P, R, N, D, 2 and L. Since the manually operated valve is designed to be operated by a driver via a lever, a large space for providing this lever is needed in the vehicle compartment. However, the disadvantage of this gear transmission mechanism is that the driver may wrongly operate the lever and, for instance, change the lever to the park position or the reverse position R while driving ahead; or otherwise change the lever to the position N instead of drive D when moving the lever back from the 2 or L positions.

SUMMARY OF THE INVENTION

The present invention has been proposed in view of the above-mentioned defects. The automatic transmission according to the present invention comprises forward and backward switches by which a driver inputs instructions as to forward or backward driving; a sensor for detecting the standstill state of the vehicle; an electronic control circuit selectively generating an output signal giving directions re forward, backward driving or neutral conditions according to the input signals applied by the above switches and the sensor; an actuator for allowing selection of one of the above driving conditions based on the output signal applied by the electronic control circuit; an automatic return means for suspending the operation of one of the switches when the other is operated; attaining forward or backward driving conditions on detecting an operation signal from one of the forward and backward switches and a vehicle suspension signal from the sensor; and attaining a neutral condition upon detecting a signal indicating the non-operation of either switch.

Since the automatic transmission thus constructed may dispense with the operation lever which requires a large amount of space in the vehicle compartment, the disadvantages of the automatic transmissions of the prior art can be eliminated and, in addition, such automatic transmission provides improved operability and safety, making it possible to offer completely automatic, simplified operation.

DETAILED DESCRIPTION OF THE PREFERRED EMBODIMENTS

Figures 1, 2:
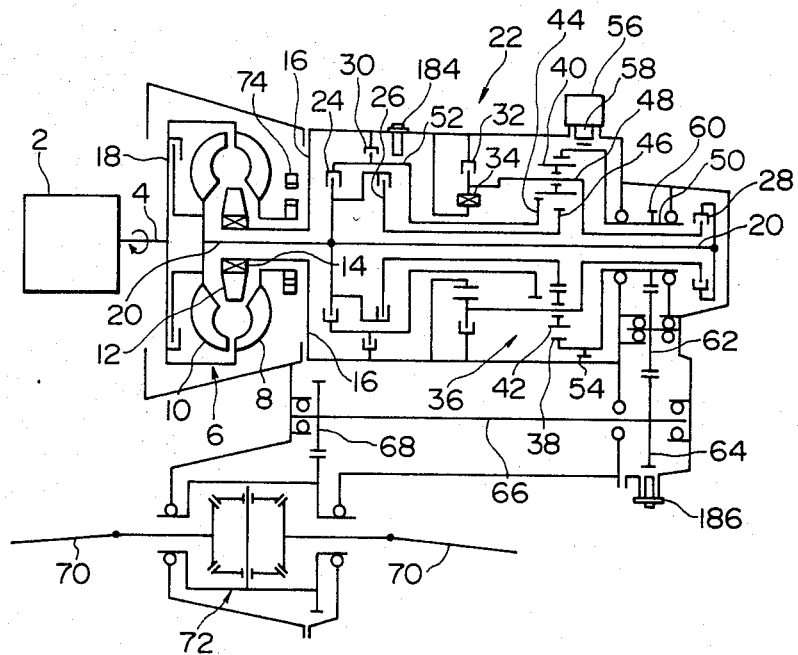
FIG. 1 is a diagram illustrating the power train of an automatic transmission as an example of the present invention.
FIG. 2 is a table illustrating the relation between the operation of each friction element and the stages of the automatic transmission.

In the power train shown in FIG. 1, a crank shaft 4 of an engine or power source 2 of the vehicle is directly connected to a pump 8 of a torque converter 6. The torque converter is equipped with the pump 8, a turbine 10, a stator 12, and a one-way clutch 14, the stator 12 being connected to a case 16 via the one-way clutch 14, so that the stator 12 is allowed to rotate by means of the one-way clutch 14 in the same direction as the crank shaft 4 but not in the opposite direction. A direct-coupled clutch 18 is provided between the crank shaft 4 and the turbine 10, the clutch 18 being coupled with the predetermined slip ratio when engaged.

Therefore, the output of the engine 2 is transmitted to the turbine 10 via the direct-coupled clutch 18 or the pump 8 of the torque converter 6.

The torque transmitted by the turbine 10 is transmitted by an input shaft 20 to speed change gears 22 installed behind the input shaft for attaining speed changes in four stages for forward driving and one stage for backward driving. The speed change gears comprises three clutch units, 24, 26, 28, two brake units 30, 32, one one-way clutch 34 and one set of planetary gears 36. The planetary gear 36 consists of a ring gear 38, a long pinion gear 40, a short pinion gear 42, a front sun gear 44, a rear sun gear 46 and a carrier 48 freely rotatable for supporting both the pinion gears 40, 42, the ring gear 38 being connected to an input shaft 50, the front sun gear 44 being connected to the input shaft 20 via a kickdown drum 52 and the front clutch 24, the rear sun gear 46 being connected to the input shaft 10 via the rear clutch 26, the carrier 48 being connected to the case 16 via the low reverse brake 32 and the one-way clutch 34 arranged functionally in parallel with each other, and also to the input shaft 10 via the four-speed clutch 28 arranged at the rear end of the speed change gears 22. The above kickdown drum 52 is fixedly connected to the case 16 by means of the kickdown brake 30, whereas a parking mechanism is composed of engaging teeth 54 formed on the external periphery of the ring gear 40 and a member 58 made to protrude by an actuator 56 of a motor, a solenoid or the like operated by a signal from an electronic control device and engaged with the teeth 54 in order to keep the ring gear 40 (i.e., the output shaft 50) from rotating.

The torque that has passed through the planetary gear 36 is transmitted to a driven gear 64 from an idle gear 62 through an output gear 60 fixed to the output shaft 50, and then transmitted to a transfer shaft 66 fixed to the gear 64 and further to a differential gear 72 to which a driving shaft 70 is connected via a helical gear 68.

Each of the above clutches and brakes is a friction clutch or a friction brake equipped with an engaging piston or a servo mechanism and operated by hydraulic pressure produced by an oil pump 74. The hydraulic pressure is supplied by a hydraulic control device to each clutch and brake, selectively, depending on the driving conditions detected by various detectors, so that combinations of clutches and brakes make it possible to control the speed in four forward stages and one backward stage. FIG. 2 illustrates the relation between the operation of each clutch or brake and the transmission stage. In FIG. 2, O refers to the state where respective clutches or brakes are engaged with the driving mechanism, whereas O indicates that the rotation of the carrier 48 is suspended because of the action of the one-way clutch 34 immediately before the low reverse brake 32 is engaged at the time of changing speeds.

Figure 3:
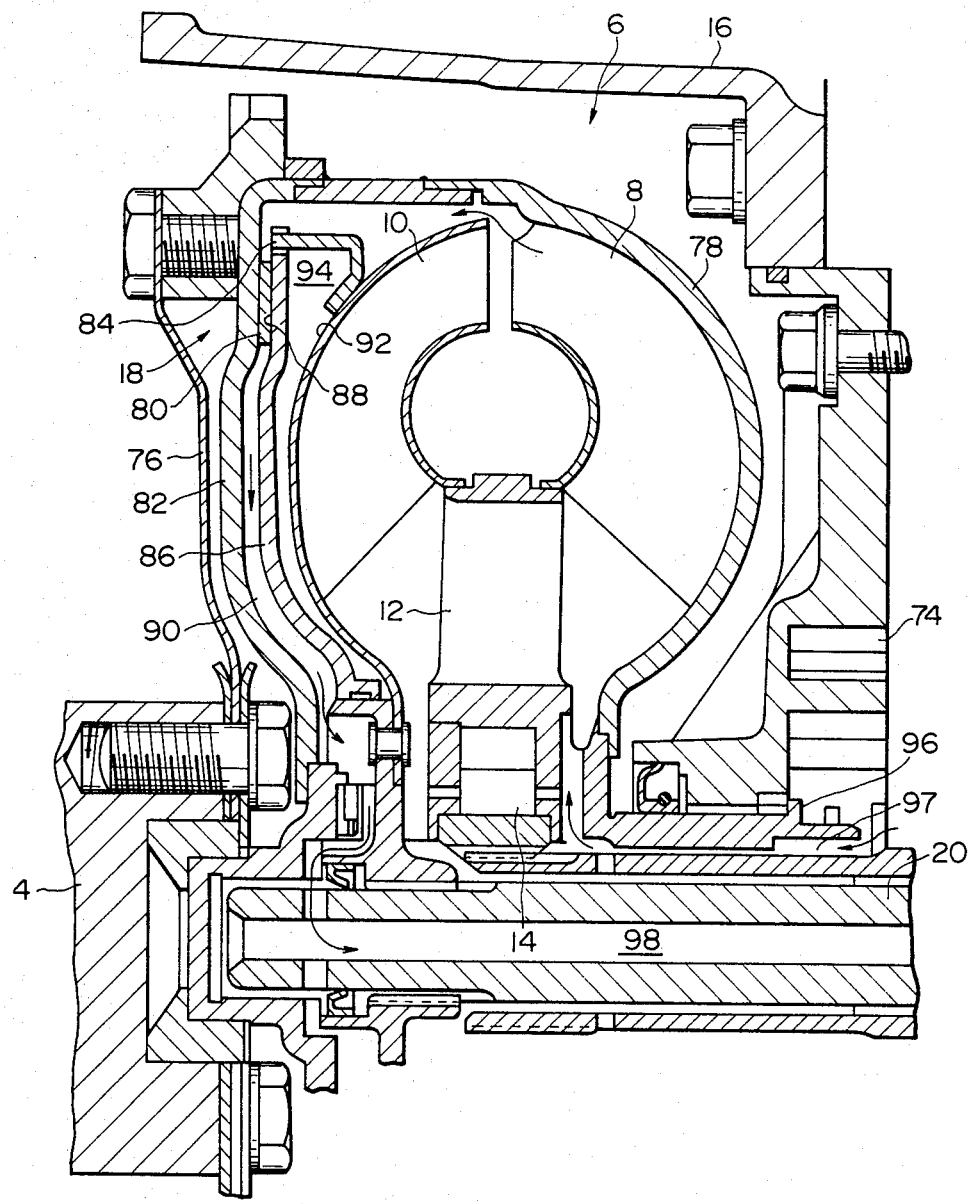
FIG. 3 is a sectional view of a torque converter and a direct-coupled clutch of the automatic transmission.

Next, the direct-coupled clutch 18 will be described with reference to FIG. 3.

The direct-coupled clutch 18 is a slip clutch for transmitting power while slipping at all times. When the clutch 18 operates, power from the engine 2 is transmitted to the input shaft 20 mainly via the clutch 18, and part of the power is transmitted via the torque converter 6. Accordingly, the torque converter 6 is prevented from slipping to a certain degree and this works to improve fuel efficiency. In addition, as the clutch 18 slips, fluctuations in the torque transmitted from the engine may be alleviated (i.e. by a damping action).

The torque converter 6 and the direct-coupled clutch 18 are formed in one body. A drive plate 76 is tightly attached to the crank shaft 4, the driver plate 76 being connected to a plate 82 to which a hull 78 of the pump 8 of the torque converter 6 and a friction plate 80 of the direct-coupled clutch 18 are fixed. The turbine 10 is engaged with the input shaft 20 by means of a spline and rotates together with the shaft and, at the same time, is connected to a piston 86 via a transfer ring 84 in such a way that the turbine 10 and the piston 86 rotates en bloc. The piston 86 is engaged with the input shaft 20 in such a manner that the piston 86 can freely slide in an axial direction, the piston 86 being arranged oppositely to the plate 82 and provided with a friction surface 88 engaging the friction plate 80. A hydraulic chamber 90 is formed between the piston 86 and the plate 82, whereas a hydraulic oil chamber 94 is provided between the circumferential surface of the hull 92 of the turbine 10 and the piston 86.

The dynamic friction coefficients of the friction plate 80 and the friction surface 88 of the direct-coupled clutch 18 are set to attain efficient transmission of power despite fluctuations in speed of the crank shaft 4.

A plurality of grooves are provided on the surface of the friction plate 80 in a radial or circumferential direction, or a combination of both; and oil passing in these grooves prevents the friction plate 80 and the friction surface 88 from being overheated.

The oil supplied to the torque converter 6 and the direct-coupled clutch 18 is regulated in pressure by hydraulic control means described later. The oil is led to the torque converter 6 from an oil route 97 formed in the inside wall of a sleeve 96 externally engaged with the input shaft 20 of the pump 8 as shown by an arrow in FIG. 3 and circulated therein. The oil is further sent to the hydraulic chamber 94 and then to the hydraulic chamber 90 passing through a gap between the friction plate 86 and the friction surface 88 of the direct-coupled clutch 18, before being passed through an oil route 98 made in the input shaft 20 and discharged or circulated in the opposite direction.

Next, hydraulic control and electronic control for attaining the speed change stages shown in FIG. 2 with the speed change gearing 22 illustrated in FIG. 1 will be described in reference to FIG. 4.

Figure 4A:
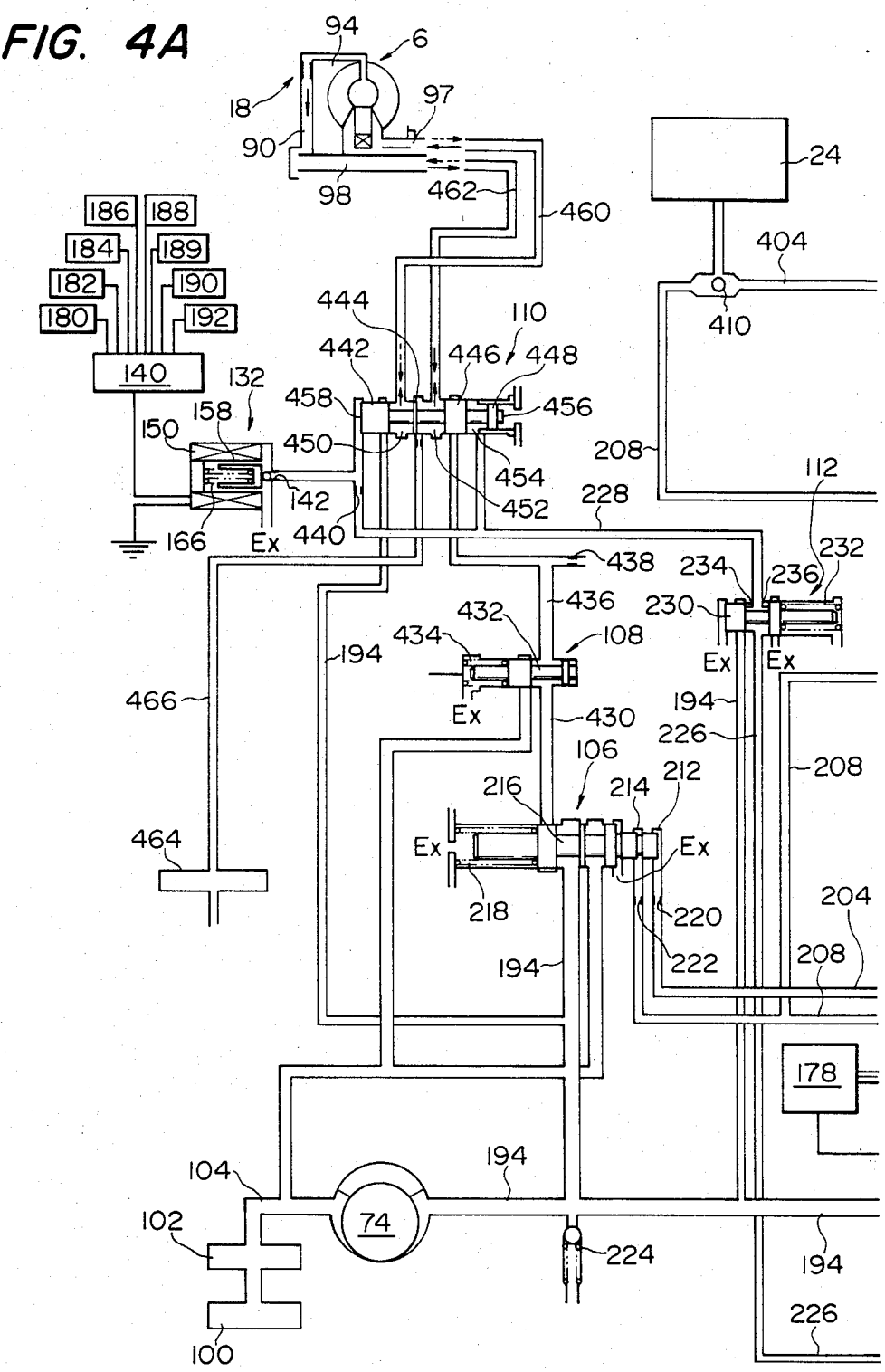
FIGS. 4A, B, and C are a circuit diagram illustrating a hydraulic control device of the transmission.
Figure 4B:
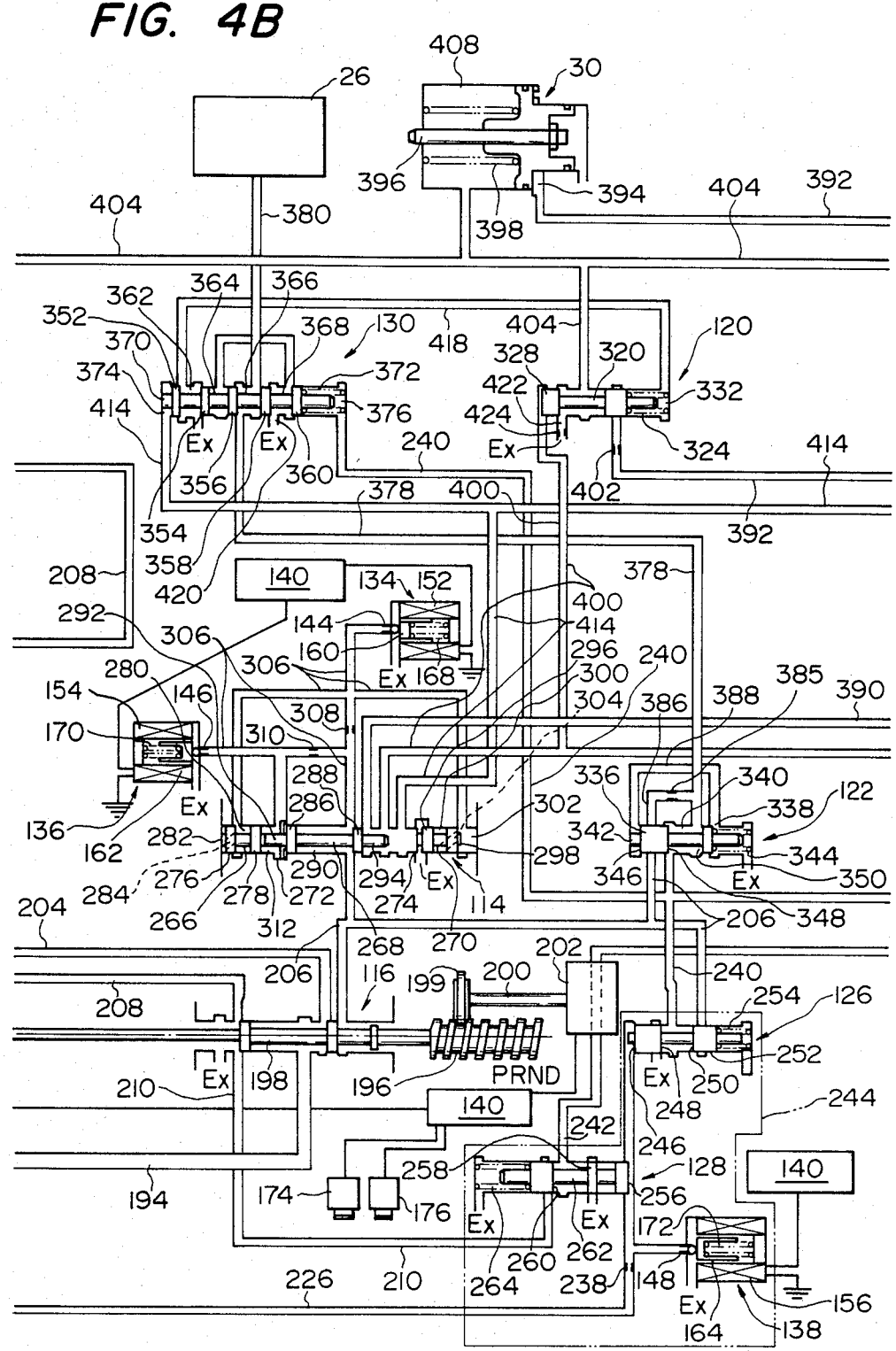

The oil hydraulic control apparatus shown in FIG. 4 operates to supply oil discharged from the oil pump 74 through an oil tank 100, and oil filter 102 and an oil route 104 selectively to each oil hydraulic chamber depending on the driving conditions, in order to operate the torque converter 6 and the direct-coupled coutch 18, the clutches 24, 26, 28 of speed change gearing 22, and the piston or servo mechanism of the brakes 30, 32.

The control apparatus comprises a pressure regulating valve 106, a torque converter control valve 108, direct-coupled clutch control valve 110, a pressure reducing valve 112, a shift control valve 114, a driving condition changeover valve 116, a 1-2 speed shift valve 118, a 2-3 speed and 4-3 speed shift valve 120, an N-D control valve 122, a 4 speed clutch control valve 124, a hydraulic control valve 126 used when changing speed, an N-R control valve 128, rear clutch control valve 130, and four solenoid valves 132, 134, 136, 138, each element being connected by an oil route.

The solenoid valves 132-138 are of the same construction and are blocked when no current is applied. These solenoid valves are used to control orifices 142, 144, 146, 148 by opening and closing them upon receiving an electrical signal from an electronic control device 140 and are equipped with valves 158, 160, 162, 164 for opening and closing solenoids 150, 152, 154, 156 and orifices 142-148 arranged in the solenoids 150-156; and springs 166, 168, 170, 172 for activating the valves 158-164 in the closing direction.

The electronic control device contains a driving condition determiner for determining the position of the driving condition changeover valve 116 and a speed change detector for detecting the commencement of a speed change. The electronic control device controls the position of the driving condition changeover valve 116 by detecting electric signals from the forward and backward switches (described later) and the driving conditions of the vehicle; controls the oil pressure by means of changing the timing to control the operation and non-operation of the solenoid valves 132, 138 where duty cycle control is carried out; and the width of a pulse current at 50 Hz supplied to the solenoid valves 132, 138; and further controls the opening and closing of the solenoid valves 134, 136.

The main input elements comprise electric signals from a forward switch 174 operated by a driver for instructing forward driving and provided in a compartment (preferably near a steering column so that the switch is readily operated by the driver); a backward switch 176 provided near the forward switch 174 and operated by the driver in instructing backward driving; a potentiometer 178 for detecting the position of the driving condition changeover valve 116; an engine load detector 180 for detecting the opening of a throttle valve (not shown) of the engine 2; a detector 184 for detecting the rpm of the kickdown drum 52 shown in FIG. 1; a detector 186 for detecting the rpm of the output shaft 60 and the speed of the vehicle by detecting the rpm of the driven gear 64; a position detector 188 for detecting the operational position of a key switch (not shown); a seat switch 189 provided in the driver's seat (not shown) for detecting the fact that the driver has taken his seat; a pedal switch 190 for detecting the operation of a brake pedal of the vehicle (not shown); a detector 192 for detecting the temperature of the lubrication oil; and the like. Either of the forward and backward switches is composed of a relay switch of a prior art construction or the like, either being equipped with an automatic return means; in other words, when one of the switches is operated, the other is not allowed to operate and when the same switch is operated twice, it will return to the original state (for instance, if the forward switch 174 initially in the operational state is operated twice, it will be placed in a non-operational state and then again returned to the operational state). These switches 174, 176 are also designed to be placed in a non-operational state when an electric signal corresponding to nearly zero in terms of the rpm of the engine from the rpm detector 182, that is, a signal indicating the standstill of the engine, is input to the electronic control device 140. In addition, the rpm detector 186 can detect the vehicle speed being equal to zero; i.e., the standstill state of the vehicle, by finding that the number of the revolutions of the driven gear 64 becomes zero or almost zero.

The oil pressure discharged from the oil pump 74 is introduced via an oil route 194 into the pressure regulating valve 106, the driving condition changeover valve 116, the pressure reducing valve 112 and the direct-coupled clutch control valve 110.

The driving condition changeover valve 116 is equivalent to the manually operated valve in the automatic transmission of the prior art, and comprises a spool valve 198 with grooves 196 made in the outside end portion; a servomotor 202, of which the rotary shaft 200 is supplied with a disc 199 is engaged with the grooves 196. The servomotor is driven in accordance with an electric signal from the electronic control device 140; and the potentiometer 178 is connected to the spool valve 198 and is used to feedback the electrical signal to the electronic control device 140 depending on the position of the spool valve 198. When the forward switch 174 is placed in an operational state, the driving condition changeover valve 116 takes the position D so that the oil route 194 makes contact with oil routes 204 and 206, whereas when the backward switch 176 is placed in an operational position, the above valve 116 holds the position R so that the oil route 194 makes contact with oil routes 208 and 210. When both switches are put in a non-operational state, the valve 116 takes the position B so that the oil route 194 contacts only the oil route 204. In addition, when the valve 116 receives an electric signal from the detector 186 for detecting the vehicle speed and the detector 188 for detecting the position of the key switch, indicating that the vehicle is in a standstill state with the key switch being turned off, the valve 116 takes the position P so that all the above oil routes 194, 204, 206, 208, 210 contact an oil discharge route. On receiving an electric signal from both the detectors 186, 188, showing that the vehicle is in a standstill state with the key switch being OFF, the electronic control device 140 moves the driving condition changeover valve 116 to the position P and simultaneously drives the actuator 56 shown in FIG. 1, making the member 58 engage the engaging teeth 54 and place the vehicle in a standstill state.

The pressure regulating valve 106 is provided with a spool valve 216 having pressure receiving surfaces 212, 214 and, when the driving condition changeover valve 116 is placed at the position N or D, the oil pressure passing through the valve 116, the oil route 204 and the orifice 220 acts on the pressure receiving surface 212. As a result, the oil pressure in the oil route 194 is regulated to remain constantly at 6 kg/cm$^2$ (line pressure). When the driving condition changeover valve 116 is put in the position R, the oil pressure in the oil route 194 passing through the valve 116, an oil route 208 and an orifice 222 acts on the pressure receiving surface 214. As a result, the oil pressure in the oil route 194 is regulated to stay at 14.6 kg/cm$^2$.

A relief valve 224 attached to the oil route 194 is an escape valve for freeing high pressure oil discharged from the oil pump 74.

The oil pressure passing through the oil route 194 is led to the pressure reducing valve 112 and controlled therein at a level of 2.4 kg/cm$^2$, and then introduced into oil routes 226 and 228. The pressure reducing valve 112 is supplied with a spool valve 230 and a spring 232 and reduces the oil pressure of the oil route 194 by utilizing the balance between the oil pressure, caused by a difference between a pressure receiving surface 234 and a pressure receiving surface 236 in terms of area, and the force of a spring 232, and supplies oil with reduced pressure to the oil routes 226, 228, the pressure receiving surfaces 234, 236 being formed oppositely on the spool valve 230.

The pressure regulated oil (reduced pressure oil) introduced to the oil route 226 is led to the oil pressure control valve 126, the N-R control valve 128 and the orifice 148 of the solenoid valve 138 via an orifice 238. The orifice 238, the oil pressure control valve 126, the N-R control valve 128 and the solenoid valve 138 constitute, through the operation of the solenoid valve, an electronic oil pressure control device 244 for generating a control pressure corresponding to the driving condition at the time of speed changing in an oil route 240 or 242.

The oil control valve 126 is provided with a spool valve 252 with pressure receiving surfaces 246, 248, 250 and a spring 254 regulates the oil pressure in the oil route 240 at a predetermined value by utilizing the balance between the oil pressure, caused by the oil pressure acting on the pressure receiving surface 246 and an area difference between surfaces 248 and 250, and the resultant of the energizing force of the spring 254.

The N-R control valve 128 is supplied with a spool valve 262 with pressure receiving surfaces 256, 258, 260 and a spring 264 regulates the oil pressure in the oil route 242 at the predetermined value utilizing the balance between the oil pressure, caused by the oil pressure acting on the pressure receiving surface 256 and an area difference 248, 250, and the resultant of the energizing force of the spring 264.

The regulated oil pressure introduced into the oil route 240 is used to control the front clutch 24, the rear clutch 26, the kickdown brake 30 and the low reverse brake 32 when the vehicle is being driven forwardly or in a standstill state, whereas the regulated oil pressure in the oil route 242 is used to control the low reverse brake 32 when backward driving is carried out.

The solenoid valve 138 receives signals from the engine load detector 180, each of the rpm detectors 182, 184, 186, the pedal switch 190 of the brake pedal, the oil temperature detector 192 and the like to detect the driving conditions by means of the electronic control device 140 and changes the timing of opening and closing the orifice 148 by altering the pulse width through duty control at 50 Hz depending on the driving conditions in order to control the oil pressure in the oil route 226 on the downstream side of the orifice 238; in other words, oil pressure P1 acting on the pressure receiving surface 146 of the oil pressure value 126 and the pressure receiving surface 256 of the N-R control valve 128. Given that the diameters of the orifices 238 and 148 are 0.8 mm and 1.4 mm, respectively, the oil pressure P1 is adjustable from about 0.3 to 2.1 kg/cm$^2$. In addition, the regulated oil pressure generated in the oil routes 240 and 242 increases and decreases in proportion to the increase and decrease of the oil pressure P1 between about 0 kg/cm$^2$ to the supplied oil pressure (oil pressure in the oil routes 206 or 210).

The point of time when the operation of the solenoid valve 138 is started and the period of time of its operation are determined by the signals from the detector contained in the electronic control device for detecting the commencement of a speed change, an engaging time detector consisting of two detectors 184, 186 for rpm detection and the like, in addition to the various above detectors 180, 182, 186, 192.

The shift control valve 114 is controlled by a combination of the making and breaking of the solenoid valves 114 and 134. The shift control valve 114 is supplied with three spool valves 266, 268, 270 and stoppers 272, 274; the spool valve 266 being provided with lands 276, 278, a circular groove 280 and an oil route 284 making contact with the circular groove 280 and a hydraulic chamber 282 to the left of the land 276 in FIG. 4; the spool valve 268 being equipped with lands having difference radii, a circular groove 290 and presses 292, 294 contacting the spool valve 270; the spool valve 270 being provided with lands 296, 298, a circular groove 300 and an oil route 304 making contact with the circular groove 300 and a hydraulic chamber 302 to the right of the land 298 in FIG. 4; the stopper 272 being made to lie between the spool valves 266, 278 and tightly attached to the casing (not shown); and the stopper 274 being made to lie between the spool valves 268, 270 and tightly attached to the casing (not shown). The oil route 206 always contacts an oil route 306 via the circular groove 290, the oil route 306 being made to contact the orifice 144 via an orifice 308; the circular groove 280 and the hydraulic chamber 282; and a hydraulic chamber 302 and a circular groove 300.

On the other hand, the oil route 306 is made to contact the orifice 146 via an orifice 310 and also an oil chamber 312 between the spool valves 266, 268.

Figures 4C, 5:
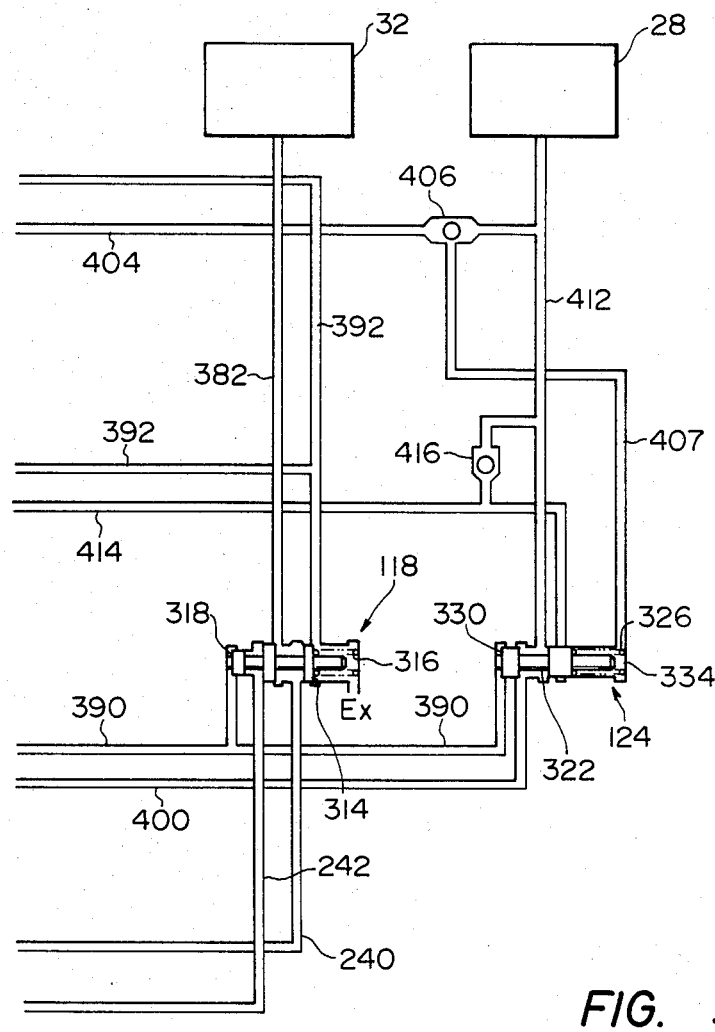
FIG. 5 is a table illustrating the relation of the operations of a solenoid valve and the stages of speed change in said oil hydraulic control device.

The relation between the opening and shutting of the solenoid valves 134 and 136 and the transmission speed stages is illustrated in FIG. 5.

The 1-2 shift valve 118 is provided with a spool valve 314 and a spring 316 and is changed over between the leftmost and rightmost (not shown) positions shown in FIG. 4 according to the supply of the line pressure to and discharge from the leftmost pressure receiving surface of the spool valve 314; namely, the valve 118 is placed at the rightmost position because of the oil pressure when the line pressure is supplied, whereas it is placed at the leftmost position because of the spring 316 when the line pressure is discharged.

The 2-3 speed shift and 3-4 speed shift valve 120 and the 4 speed clutch control valve 124 are also supplied with spool valves 320, 322 and springs 324, 326, respectively. Oil chambers 328, 330 into which the line pressure is introduced are provided on the lefthand side of each of the spool valves, whereas oil chambers 332, 334 are provided on the righthand side. Each spool valve is changed between the leftmost position shown in FIG. 4 and the rightmost position.

The N-D control valve 122 is equipped with lands 338, a spool valve 342 with a circular groove 340 and a spring 344. Change over of the spool valve 342 between the leftmost position shown in FIG. 4 and the rightmost position is selectively effected according to the resultant of the oil pressure acting on pressure receiving surfaces 346, 348 and 350 and of the energizing force of the spring 344.

The rear clutch control valve 130 is provided with five lands 352, 354, 356, 358, 360, a spool valve 370 having circular grooves 362, 364, 366, 368 and a spring 372; the diameter of the land 352 is made slightly larger than that of the land 360. The spool valve 370 is selectively changed over to the leftmost position shown in FIG. 4 or the rightmost position based on the balance among the force exerted by the oil pressure introduced into the hydraulic chamber 374 on the left of the land 352 in FIG. 4 against the pressure receiving surface of the land 352, the force exerted by the oil pressure introduced into the hydraulic chamber 376 on the right of the land 360 in FIG. 4 against the pressure receiving surface of the land 360, and the energizing force of the spring 372.

A description of speed change control via the selective engagement of each friction device will be given below.

When a driver places the forward switch 174 in an operational state, the electronic control device 140 transmits a signal and drives the servomotor 202 and then changes the spool valve 198 over to the position D. When the driving condition changeover valve 116 is placed in the position D, the line pressure (adjusted to 6 kg/cm$^2$) in the oil route 194 is supplied to the oil route 206.

The line pressure in the oil route 206 is led to the hydraulic chamber of the rear clutch 26 via the oil prssure control valve 126, the oil route 240, the N-D control valve 122, the oil route 378, the rear clutch control valve 130 and the oil route 380, and is then introduced into the hydraulic chamber of the low reverse brake 32 via the oil route 240, the 1-2 speed shift valve 118 and the oil route 382, so that the first speed is accomplished by the engagement of the rear clutch 26 and the low reverse brake 32. (See FIG. 2).

At this time, because of the operation of the oil pressure control valve 126, the sharp rise of the oil pressure in the oil hydraulic chamber of the rear clutch 26 may be checked. Thus, the occurrence of shock is prevented.

With respect to the operation of the N-D control valve 122, when oil pressure is led to the circular grooves 340 from the oil route 240, the spool valve 342 is pressed toward the right in FIG. 4 resisting the energizing force of the spring 344 because of the difference in area between the pressure receiving surfaces 348, 350. As a result, the oil route 240 loses contact with the oil route 278 and, on the contrary, the oil route 206 makes contact with the oil route 378 via an oil route 386 equipped with an orifice 385, while the oil route 206 contacts an oil route 388. Consequently, as long as the driving condition changeover valve 116 is maintained at the position D, the oil route 206 makes contact with the oil route 278 without the aid of the oil pressure control valve 126, whereas the hydraulic chamber of the rear clutch 26 is free from the influence of the oil pressure reducing control by means of the oil pressure control valve 126 at the time of changing speeds, so that problems such as a shock generated due to the slipping of the rear clutch 26 at the time of changing speeds and the racing of the engine can be prevented.

When the driving condition changeover valve 116 is changed from the position N over to D, oil pressure is led to the shift control valve 114 from the oil route 206. However, when current is allowed to flow into the solenoid valves 134, 136 to keep open the orifices 144, 146 for attaining the first speed, the oil pressure downstream of the orifices 308, 310 becomes almost 0 kg/cm$^2$ because of the orifices 308, 310, and the spool valve 268 receives a pressure forcing the valve to move toward the lefthand side, the pressure being changed by the high oil pressure generated in the circular groove 290 and the difference in area between the pressure receiving surfaces of the lands 286, 288. Consequently, the spool valve 268 stops at the leftmost position shown in FIG. 4.

When the driver steps on the accelerator to increase the vehicle speed, the electronic control device 140 issues an instruction concerning the attainment of the second speed to the solenoid valves 134 and 136, whereby the current stops flowing into the solenoid valve 134, while the solenoid valve 136 keeps receiving the current.

According to the changeover operation, the high oil pressure in the oil route 306 is introduced into the circular groove 280, the oil route 284, the oil chambers 282 and 302 and the circular groove 300 via the orifice 308. Then the spool valve 266 together with the spool valve 268 move to the right and stop when the spool valve 266 contacts the stopper 272.

Then the line pressure in the oil route 206 is led to the oil route 390 via the circular groove 290 and the line pressure acts on the hydraulic chamber 318 of the 1-2 speed shift valve 118 and moves the spool valve 314 to the rightmost position in FIG. 4. The line pressure also acts on the hydraulic chamber 330 of the 4 speed clutch control valve 124 and moves the spool valve 322 thereof to the rightmost position in FIG. 4. The line pressure being supplied to the oil route 240 is supplied to an oil chamber 294 on the engagement side of the kickdown brake 30 via the oil route 392, and a rod 296 moves to the left in resisting the spring 398, making a brake band (not shown) engage the kickdown drum 52. On the other hand, the oil pressure in the oil route 382 is discharged through the oil route 242, releasing the engagement of the low reverse brake 32 in order to attain the second speed.

At this time, the oil pressure control valve 126 responds to the oil pressure control provided by the solenoid 138 and the reduces the oil pressure in the oil route 240 only at the time of a speed change, to thereby prevent shocks caused by the speed change.

When current flow to the solenoid valves 134 and 136 is suspended to attain the third speed based on the instruction given by the electronic control device 140, the line pressure is supplied to the oil hydraulic chamber 312 of the shift control valve 114, whereas the spool valve 268 moves to the right in FIG. 4 under the influence of the line pressure on the pressure receiving surface of the land 286. The oil route 206 than makes contact with an oil route 400 and the line pressure is introduced into the hydraulic chamber 328 of the 2-3 speed and 4-3 speed shift valve 120. The spool valve 230 of the 2-3 speed and 4-3 speed shift valve 120 is thereby changed over to the rightmost position. At this time, oil route 392 makes contact with an oil route 404 via an orifice 402.

The oil route 404 makes contact with the hydraulic chamber 334 of the 4 speed clutch control valve 124 via an oil route 407, and simultaneously with the oil chamber of the front clutch 24 via a hydraulic chamber 408 on the opening side of the kickdown brake 30 and a changeover valve 410. Since the oil route 404 is permitted to contact the hydraulic chamber 408 on the opening side of the kickdown brake 30 and the hydraulic chamber of the front clutch, the engagement of both and also the release of such engagement is carried out in an overlapping manner.

During the process of changing from speeds 2 to 3, the oil pressure control valve 126 operates in the same way as in the case of changing speeds from 1 to 2, and the supply of oil pressure in the oil route 240 is kept low for a short time.

The oil route 392 is provided with an orifice 402 and the oil pressure in the hydraulic chamber 408 and the hydraulic chamber of the front clutch 24 is kept low because of the action of the orifice 402 while the oil pressure control valve 126 is being operated. The engagement of the front clutch 24 is carried out closely together with the release of the kickdown brake 30, and this is followed by the suspension of the operation of the oil pressure control valve 126 causing the oil pressure to increase up to 6 kg/cm$^2$, whereby the engagement of the front clutch 24 is completed for the attainment of the third speed. In this case, because the rotating speeds of the input shaft 20 and the kickdown drum 52 correspond to that of the output shaft 50, this state of coincidence or that immediately before is taken as the termination of the speed change and detected by the rpm detectors 184, 186. Based on this detection, the oil pressure control valve 126 is made to stop its operation and the oil pressure supplied to the front clutch 24 is increased to 6 kg/cm$^2$.

As a result of increases in oil pressure, the oil pressure in the oil hydraulic chamber 334 of the 4 speed clutch control valve 124 is also increased, whereby the spool valve 322 is changed over to the leftmost position in FIG. 4 and the line pressure in the oil route 400 is supplied to the 4 speed clutch 28 via an oil route 412 so that the engagement of the 4 speed clutch 28 is completed.

The oil route 412 is kept in contact with the hydraulic chamber 334 via the changeover valve 406 and the oil route 407 and, when the line pressure has been once supplied to the oil route 412, the spool valve 422 of the 4 speed clutch control valve 124 is held at the leftmost position until the line pressure is discharged from the oil route 412; and this prevents problems such as the impossibility of changing speeds, and bringing about a neutral state as the 4 speed clutch 48 disengages or slips while the speed is being changed from 3 to 4.

When current is applied to the solenoid valve 134 by the instruction of the electronic control device 140 to attain the speed 4, the solenoid valve 136 is not supplied with current, whereby the oil pressure in the hydraulic chamber 302 of the spool valve 270 is reduced, and the spool valve 270 together with the spool valve 268 move to the righthand side and take the rightmost position in FIG. 4. As a result, the line pressure in the oil route 206 is led to the hydraulic chamber 374 of the rear clutch valve 130 via an oil route 414 and an oil route 412 via check valve 416.

The spool valve 370 of the rear clutch control valve 130 moves to the rightmost position in FIG. 4 by the line pressure supplied to the oil hydraulic chamber 374, and the oil route 141 and an oil route 418 contact each other so that the line pressure is supplied to the oil chamber 332 of the 2-3 speed and 4-3 speed shift valve 120, while the spool valve 320 of the valve 120 is changed over to the leftmost position in FIG. 4. As this time, oil in the hydraulic chamber of the rear clutch 26 is discharged from the oil discharge port 420 of the rear clutch control valve 130 releasing the rear clutch 26 immediately, whereas oil in the hydraulic chamber of the front clutch 24 and the hydraulic chamber 408 of the kickdown brake 30 is discharged from the oil discharge port 422 of the 2-3 speed and 4-3 speed shift valve 120 through an orifice 424 so that the front clutch 24 is released. The kickdown brake is then engaged smoothly because the oil pressure control valve 126 operates, in the same way as in the case of changing speeds from 1 to 2 or from 2 to 3, to reduce the oil pressure in the oil route 240 for a short period of time during which the speed is changed. When the engaging oil pressure is increased to 6 kg/cm$^2$, the engagement is completed for attainment of the forth speed.

With respect to down shifting, the changeover of the oil hydraulic operating system is operated in the reverse order of the upshifting sequence just described. When the flow of current into the solenoid valves 134, 136 for changing speeds from 4 to 3 is stopped, the line pressure in the oil route 414 is discharged, whereas the spool valve 370 of the rear clutch control valve 130 is changed over to the leftmost position while the spool valve 320 of the 2-3 speed and 4-3 speed shift valve 120 is changed over to the rightmost position, so that the oil pressure in the oil routes 380, 404 is supplied.

Then the oil pressure for the hydraulic chamber 408 of the kickdown brake 30 and the oil chamber of the front clutch 24 is smoothly supplied via the orifice 402, whereas the oil pressure for the hydraulic chamber of the rear clutch 26 is gradually supplied via the orifice 385 with a sufficient time lag in comparison with the case of the front clutch 24. In addition, although the kickdown brake 30 is instantly released, the oil pressure control valve 126 for controlling the pressure for a short time at the time of speed changing operates to keep the oil pressure to the oil route 404 low even at the time of reducing speeds. These operations are aimed at preventing shocks caused by the engagement of the rear clutch 26 of greater torque capacity.

When the speed is changed from 3 to 2, current is made to flow into the solenoid valve 136 but not into the solenoid valve 134 and the oil pressure in the oil hydraulic chamber 312 of the shift control valve 114 is reduced. The spool valve 268 moves one step to the left in FIG. 4 allowing the oil pressure in the oil route 400 to be discharged. As a result, the spool valve 320 of the 2-3 and 4-3 speed shift valve 120 moves to the leftmost position, causing the oil pressure in the oil route 404 to be discharged, and the spool valve 322 of the 4 speed clutch control valve 124 moves to the rightmost position, allowing the oil pressure in the oil route 412 to be discharged, so that the engagement of the 4 speed clutch 28 is immediately released. With respect to the release of the front clutch 24 and the engagement of the kickdown brake 30, the oil pressure control valve 126 operates to carry out such release and engagement smoothly in the same way as in the case of changing speeds from 4 to 3 as mentioned above, in order to attain the second speed.

When the speed is changed from 2 to 1, current is allowed to flow into the solenoid valves 124 and 136, whereas the shift control valve 114 moves to the leftmost position. The oil pressure in the oil route 390 is discharged and the spool valve 314 of the 1-2 speed shift valve 118 and the spool valve 322 of the 4 speed clutch control valve 124 move to the leftmost position, whereby the oil pressure of the oil hydraulic chamber 394 of the kickdown brake 30 is discharged, causing the brake 30 to be released, and the engagement of the low reverse brake 32 is completed for the attainment of the first speed.

When the driver operates the backward switch 176, the electronic control device 140 transmits a signal for driving the servomotor 202 and changes the spool valve 198 over the position R. When the drive condition changeover valve 116 is set at the position R, the oil route 174 makes contact with oil routes 208 and 210. The oil route 210 contacts the low reverse brake 32 via the N-R control valve 128, the oil route 242, the 1-2 speed shift valve 118 and the oil route 382, whereas the oil route 208 contacts the oil hydraulic chamber of the front clutch 24 via the changeover valve 410, so that the front clutch 24 is engaged along with the low reverse brake 32 to attain backward driving. Like the case of forward driving, the solenoid valve 138 operates for a short time when the speed is being changed to prevent shocks, as the oil pressure supplied to the low reverse brake 32 is maintained at a low level by controlling the N-R control valve 128.

The oil led from the oil route 430 to the torque converter control valve 108 via the pressure regulating valve 106 is adjusted to 2.5 kg/cm$^2$ by utilizing the balance between the control oil acting on the rightmost pressure receiving surface of the spool valve 342 and the energizing force of a spring 434, and is directed to the direct-coupled clutch control valve 110 via the oil route 436. In addition, the oil in the oil route 436 is supplied to the lubricating system in the latter half of the transmission via an orifice 438.

The oil so adjusted to 2.4 kg/cm$^2$ by the pressure reducing valve 112 and led to the oil route 228 is supplied to an orifice 142, the opening and shutting of which are controlled by the solenoid valve 132 through an orifice 440.

The direct-coupled clutch control valve 110 is provided with a spool valve 456 having four lands 442, 444, 446, 448 and circular grooves 450, 452, 454 provided between the lands. The control oil pressure adjusted by the solenoid valve 132 to the range of 0.3-1.9 kg/cm$^2$ acts on one end of a pressure receiving surface 458 of the land 442 and, on the other hand, the oil route 228 directly contacts the circular groove 454, whereas the oil adjusted by the pressure reducing valve 112 acts on the pressure receiving surfaces of both lands 446, 448. The above oil also acts on a spool valve 456 as a pressing force toward the lefthand side in FIG. 4 caused by the difference in area between the pressure receiving surfaces. The pressure receiving surface of the land 442 is made smaller than that of the land 444, and the direction of the flow of the oil supplied to the torque converter 6 and the direct-coupled clutch 18, and its pressure are controlled by the balance between the pressure to the right in FIG. 4 caused by the oil pressure supplied to the above pressure receiving surface 458 and the circular groove 450 and the pressure to the left in FIG. 4 caused by the oil pressure in the circular groove 454.

The oil route 97 followed by the torque converter 6 is connected to an oil route 460, whereas the oil route 98 followed by the direct-coupled clutch 18 is connected to an oil route 462. By the changeover control provided by the direct-coupled clutch control valve 110, the oil route 460 selectively makes contact with the oil supply route 194 or an oil discharge route 466 connected to a lubrication system provided in the first half portion of the transmission from an oil cooler 464, the oil route 462 being made to selectively contact the oil supply route 436 or the oil discharge route 466.

When an instruction is given by the electronic control device 140 as to the engagement of the solenoid valve 132 for the direct-coupled clutch 18, the oil adjusted by the direct-coupled clutch control valve 110 as shown by an arrow in FIG. 4 is supplied to the oil route 460 through the oil route 194. The direct-coupled clutch 18 is engaged with a predetermined amount of slippage because the oil pressure acting on the hydraulic chamber 94 presses the piston 86 toward the lefthand side. If the oil pressure acting on the piston 86 is controlled by the electronic control device 140 to provide the piston with a slip amount slightly smaller than the range of the speed change of the crank shaft 4 caused by the fluctuating torque of the engine 2, highly efficient transmission of power will be accomplished practically without transmitting the fluctuating torque of the crank shaft 4. This helps improve fuel efficiency. Furthermore, it is necessary to release the direct-coupled clutch 18 in order to utilize the characteristics of the torque converter in view of the driver's feeling at the time of starting the engine or sharply accelerating vehicle speed. In this case, the electronic control device 140 instructs the suspension of current to the solenoid valve 132, so that the direct-coupled clutch control valve 110 is changed over, causing oil to flow in the reverse direction as shown by a broken line in FIG. 4. In other words, the oil pressure as low as 2.5 kg/cm² provided by the torque converter control valve 108 is supplied to an oil route 462 via the oil route 436, whereas the engagement of the direct-coupled clutch 18 is released because the oil pressure acting on the oil hydraulic chamber 90 forces the piston 86 to move to the righthand side.

Referring to the above construction, up-shifting between first to fourth speeds and down-shifting can be accomplished by a procedure in which the electronic control device 140 receives a signal signifying the driving condition from the forward switch 174 and sets the driving condition changeover valve 116 to the position D and then receives signals from the engine load detector 180 as well as the rpm detector 186 for detecting the vehicle speed so as to give instruction to the solenoids 134, 136 according to the predetermined speed change characteristics. In addition, the device is also constructed so that the acceleration of the vehicle is detected by differentiating the vehicle speed signal given by the rpm detector in the case of long distance downhill driving and so that the electronic control device 140, when this device receives a signal from the load detector 180 for completely closing the throttle valve as the acceleration exceeds the predetermined value and a signal from the pedal switch 190 indicating that the brake has been operated, issues an instruction as to shifting the speed stage down depending on the acceleration and vehicle speed.

When the forward and backward switches 174, 176 are placed in a non-operational state, the electronic control device 140 transmits a signal to the servomotor 202 instructing the servomotor to change the driving condition changeover valve 116 over to the position N and to reduce the transmission to a neutral state. Upon receipt of data as to the engine rpm being zero from the detector 182, that is, a signal indicating the standstill state of the engine, the electronic control device 140 operates to put both the switches 174, 176 in a non-operational state and changes the changeover valve 116 over to the position N for attaining neutral. Furthermore, when the driver operates the wrong switch by mistake during driving the vehicle and has instructed a direction opposite to the driving direction (for instance, when the driver has operated the backward switch 176 when driving ahead), the electronic control device 140 transmits a signal to the servomotor instructing the changeover of the changeover valve 116 to the position N for attaining neutral.

In case the switches are wrongly operated by mistake, to establish the neutral state, the switch that has been operated immediately before the wrong operation is put in a memory when driving is proceeding and the neutral state is restored when a switch instructing driving in an opposite direction is operated by mistake. Otherwise, a detector for detecting the direction in which the vehicle is proceeding is provided and when a signal from the detector and a signal from the switches 174, 176 are opposite in direction, the neutral state is attained. Needless to say, this mechanism for preventing any danger caused by the wrong operation is arranged so that it will not operate when the vehicle is in a standstill state and, in addition, when the switch for instructing driving in the same direction as that proceeding is again operated, the original state can be naturally attained.

As mentioned above, when the electronic control device 140 receives the standstill signal from the rpm detector 186 and a key switch OFF signal (that is, the standstill state of the engine) from the position detector 188 of the key switch, the device sends a signal to the servomotor 202 instructing the changeover of the driving condition changeover valve 116 to the position P and energizes the actuator 56 shown in FIG. 1 to allow the member 58 to engage with the engaging teeth 54 to place the vehicle in a standstill state. This standstill state will be released when the electronic control device 140 receives a signal from the rpm detecotor 182 (the signal indicating achievement of a predetermined rpm, for instance 400 r.p.m.) for operating the engine and a signal from the seat switch 189 indicating that a driver has taken his seat, and the device thus sends a release signal to the actuator 56.

As has been made clear in the above, according to the present invention, only two switches for instructing forward and backward driving are used by the driver, and the conventional lever for switching oil hydraulic circuits is made unnecessary, so that a larger space can be secured for the driver, and operability as well as safety are improved because wrong operation can be prevented, making it unnecessary to handle a lever in a complicated manner, and vehicle operation can be simplified.

In the above example of the present invention, when a particular stage irrespective of the driving conditions of a vehicle is required, another switch in addition to the forward and backward ones should be provided, whereby the electronic control device 140 is made to give instructions to the solenoids 132, 134 according to the instructions given by the switch when it has been operated.

What is claimed is:

1. An automatic transmission for a vehicle, comprising; forward switch means by which a driver instructs forward driving, reverse switch means by which a driver instructs reverse driving, vehicle sensor means for detecting a stopped state of the vehicle, electronic control means for transmitting an output signal for selectively instructing a forward driving condition, a reverse driving condition or a neutral condition according to input signals from said switch means and said vehicle sensor, and actuator means for selectively attaining one of said driving conditions in response to said output signal from said electronic control device, in a manner such that when an operational state of one of said forward and reverse switch means and a signal indicating the stopped state of said vehicle from said vehicle sensor are detected by said electronic control means, said forward or reverse driving condition corresponding to said switch means in the operational state is attained by said actuator means, whereas when a non-operational state of both said switches is detected by said electronic control means, said actuator means attains said neutral condition.

2. An automatic transmission as claimed in claim 1, further comprising automatic return means for placing one of said forward and reverse switch means in said non-operational state when the other is placed in said operational state.

3. An automatic transmission as claimed in claim 2, said automatic return means operating to place both said switch means in said non-operational state upon receiving an engine suspension signal from a sensor for detecting engine speed.

4. An automatic transmission as claimed in claim 1, wherein when said forward switch means or said reverse switch means is operated while the vehicle is being driven in a respective opposite direction, said electronic control circuit transmits a signal to said actuator instructing said actuator to attain said neutral state, said neutral state being maintained until the actuation of said switch means indicating the same direction as that in which said vehicle is being driven.

5. An automatic transmission as claimed in claim 1, further including a park state wherein said transmission is locked, said park state being attained by said actuator means in response to said electronic control means in response to the receipt thereof of said signal indicating said stopped state and a signal indicating a key-off position of a key switch.

6. An automatic transmittion as claimed in claim 1, said actuator means comprising hydraulic control means for effecting engagement and disengagement of clutches and brakes of said transmission to achieve forward speed ratios, a reverse speed ratio, said neutral state and a locked park state.

7. An automatic transmission as claimed in claim 6, said actuator means including oil pressure supply means, and oil pressure control means including at least a plurality of solenoid values.

8. An automatic transmission as claimed in claim 7, including at least one solenoid valve operated during a shift from one ratio to another to temporarily lower the oil pressure, thereby preventing shock during said shift.

9. An automatic transmission as claimed in claim 1, said transmission including a plurality of clutches and brakes selectively engageable to effect range selection, said actuator means comprising hydraulic control means for controlling actuation of said clutches and brakes, and including means for smoothing said actuation.

10. An automatic transmission as claimed in claim 1, further including key switch position detection means, engine speed detection means, seat switch means and a driving condition changeover valve, said electronic control means operating said condition changeover valve so as to assume a neutral position upon the detection by the former of the non-operational states of both said forward and reverse switch means, and to assume a park or transmission lock position upon detection of said stopped state and an OFF position of said key switch, said forward and reverse switch means being placed in said non-operational state condition upon detection of a substantially zero output of said engine speed detection means.

11. An automatic transmission as claimed in claim 10, said electronic control means operating said condition changeover valve so as to release said transmission lock position upon detection of an ON position of said seat switch and a predetermined engine rpm.

12. An automatic transmission for a vehicle, comprising; forward switch means by which a driver instructs forward driving, reverse switch means by which a driver instructs reverse driving, vehicle sensor means for detecting a stopped state of the vehicle, electronic control means for transmitting an output signal for selectively instructing a forward driving condition, a reverse driving condition or a neutral condition according to input signals from said switch means and said vehicle sensor, and actuator means for selectively attaining one of said driving conditions in response to said output signal from said electronic control device, in a manner such that when an operational state of one of said forward and reverse switch means and a signal indicating the stopped state of said vehicle from said vehicle sensor are detected by said electronic control means, said forward or reverse driving condition corresponding to said switch means in the operational state is attained by said actuator means, whereas when a non-operational state of both said switches is detected by said electronic control means, said actuator means attains said neutral condition, said transmission further comprising automatic return means for placing one of said forward and reverse switch means in said non-operational state when the other is placed in said operational state, said automatic return means operating to place both said switch means in said non-operational state upon receiving an engine suspension signal from a sensor for detecting engine speed.

13. An automatic transmission for a vehicle, comprising; forward switch means by which a driver instructs forward driving, reverse switch means by which a driver instructs reverse driving, vehicle sensor means for detecting a stopped state of the vehicle, electronic control means for transmitting an output signal for selectively instructing a forward driving condition, a reverse driving condition or a neutral condition according to input signals from said switch means and said vehicle sensor, and actuator means for selectively attaining one of said driving conditions in response to said output signal from said electronic control device, in a manner such that when an operational state of one of said forward and reverse switch means and a signal indicating the stopped state of said vehicle from said vehicle sensor are detected by said electronic control means, said forward or reverse driving condition corresponding to said switch means in the operational state is attained by said actuator means, whereas when a non-operational state of both said switches is detected by said electronic control means, said actuator means attains said neutral condition, and wherein when said forward switch means or said reverse switch means are operated while the vehicle is being driven in a respective opposite direction, said electronic control circuit transmits a signal to said actuator instructing said actuator to attain said neutral state, said neutral state being maintained until the actuation of said switch means indicating the same direction as that in which the vehicle is being driven.

14. An automatic transmission for a vehicle, comprising; forward switch means by which a driver instructs forward driving, reverse switch means by which a driver instructs reverse driving, vehicle sensor means for detecting a stopped state of the vehicle, electronic control means for transmitting an output signal for selectively instructing a forward driving condition, a reverse driving condition or a neutral condition according to input signals from said switch means and said vehicle sensor, and actuator means for selectively attaining one of said driving conditions in response to said output signal from said electronic control device, in a manner such that when an operational state of one of said forward and reverse switch means and a signal indicating the stopped state of said vehicle from said vehicle sensor are detected by said electronic control means, said forward or reverse driving condition corresponding to said switch means in the operational state is attained by said actuator means, whereas when a non-operational state of both said switches is detected by said electronic control means, said actuator means attains said neutral condition, and further including a park state wherein said transmission is locked, said park state being attained by said actuator means in response to said electronic control means in response to the receipt thereof of said signal indicating said stopped state and a signal indicating a key-off position of a key switch.

15. An automatic transmission for a vehicle, comprising; forward switch means by which a driver instructs forward driving, reverse switch means by which a driver instructs reverse driving, vehicle sensor means for detecting a stopped state of the vehicle, electronic control means for transmitting an output signal for selectively instructing a forward driving condition, a reverse driving condition or a neutral condition according to input signals from said switch means and said vehicle sensor, and actuator means for selectively attaining one of said driving conditions in response to said output signal from said electronic control device, in a manner such that when a operational state of one of said forward and reverse switch means and a signal indicating the stopped state of said vehicle from said vehicle sensor are detected by said electronic control means, said forward or reverse driving condition corresponding to said switch means in the operational state is attained by said actuator means, whereas a non-operational state of both said switches is detected by said electronic control means, said actuator means attains said neutral condition, and further including key switch detection means, engine speed detection means, seat switch means and a driving condition changeover valve, said electronic control means operating said condition changeover valve so as to assume a neutral position upon the detection by the former of the non-operational states of both said forward and reverse switch means, and to assume a park or transmission lock position upon detection of said stopped state and an OFF position of said key switch, said forward and reverse switch means being placed in said non-operational state condition upon detection of a substantially zero output of said engine speed detection means.

* * * * *